United States Patent
Clauss et al.

(10) Patent No.: US 7,307,138 B2
(45) Date of Patent: Dec. 11, 2007

(54) POLYMER ELECTROLYTES AND PROCESS FOR THEIR PREPARATION

(76) Inventors: Joachim Clauss, Johannesallee 41, 65929 Frankfurt (DE); Gregor Deckers, Johannesallee 41, 65929 Frankfurt (DE); Arnold Schneller, Berliner Strasse 37, 64409 Messel (DE); Helmut Witteler, Johannesallee 12, 65929 Frankfurt (DE)

( * ) Notice: Subject to any disclaimer, the term of this patent is extended or adjusted under 35 U.S.C. 154(b) by 0 days.

(21) Appl. No.: 11/036,635

(22) Filed: Jan. 14, 2005

(65) Prior Publication Data

US 2005/0131196 A1 Jun. 16, 2005

Related U.S. Application Data

(63) Continuation of application No. 10/268,316, filed on Oct. 10, 2002, now abandoned, which is a continuation of application No. 08/913,654, filed as application No. PCT/EP96/00925 on Mar. 5, 1996, now abandoned.

(30) Foreign Application Priority Data

Mar. 20, 1995 (DE) ................. 195 10 027
Dec. 7, 1995 (DE) ................. 195 45 643

(51) Int. Cl.
*C08G 8/02* (2006.01)
*C08G 65/00* (2006.01)
*C08G 65/48* (2006.01)

(52) U.S. Cl. ............ 528/125; 528/128; 528/175; 528/219; 528/226; 528/229; 528/373; 528/391; 528/482; 525/328.5; 525/471; 525/535; 521/27; 521/28

(58) Field of Classification Search .......... 528/125, 528/128, 175, 219, 226, 229, 373, 391, 482; 525/328.5, 471, 535; 521/27, 28
See application file for complete search history.

(56) References Cited

U.S. PATENT DOCUMENTS

| | | |
|---|---|---|
| 5,089,192 A | 2/1992 | Costa |
| 5,362,836 A | 11/1994 | Helmer-Metzmann et al. |
| 5,438,082 A | 8/1995 | Helmer-Metzmann et al. |
| 5,510,424 A | 4/1996 | Helmer-Metzmann et al. |

FOREIGN PATENT DOCUMENTS

| | | |
|---|---|---|
| EP | 0337626 | 10/1989 |
| EP | 0574791 | 12/1993 |
| EP | 0575807 | 12/1993 |
| EP | 0604881 | 7/1994 |

OTHER PUBLICATIONS

Int. J. Hydrogen Energy, vol. 18, No. 8, pp. 641-646, 1993.
Journal of Polymer Science: Polymer Chemistry Edition, vol. 23, pp. 2205-2223 (1985).

*Primary Examiner*—Duc Truong
(74) *Attorney, Agent, or Firm*—Frommer Lawrence & Haug LLP

(57) ABSTRACT

A sulfonated aromatic polyether ketone of the formula (II)

[Ar—O—Ar'—CO—Ar'—O—Ar—CO—Ar"—CO—] (II)

in which from 1% to 100% of the O-phenylene-CO units are substituted with an $SO_3M$ group and sulfonated and unsulfonated O-phenylene-CO units can be in any desired sequence with respect to one another, the radicals Ar, Ar' and Ar" independently of one another are substituted or unsubstituted 1,2-, 1,3- or 1,4-phenylene rings, and M, taking into account the ionic valencies, comprises one or more elements selected from the following group: H, $NR_4+$, where R is H or $C_1$-$C_4$-alkyl, or an alkali metal or alkaline earth metal or a metal from subgroup 8, and is preferably H, $NR_4^+$, Li, Na, K, Ca, Mg, Fe or Pt.

9 Claims, No Drawings

POLYMER ELECTROLYTES AND PROCESS FOR THEIR PREPARATION

This application is a continuation of U.S. application Ser. No. 10/268,316, filed on 10 Oct. 2002, now abandoned, which in turn is a continuation of U.S. application Ser. No. 08/913,654, filed on 18 Sep. 1997, now abandoned, which in turn is a 371 application of PCT/EP96/00925, filed on 5 Mar. 1996.

The invention relates to polymer electrolytes which consist of a sulfonated aromatic polyether ketone, to a process for their preparation, to the use of these polymer electrolytes, and to solutions of these polymer electrolytes and the use thereof.

Sulfonated polyether ketones constitute cationic ion exchangers. They are useful as membrane materials, for example for ultrafiltration, for desalination and for the removal of microorganisms, since in many cases they are mechanically stable even in the presence of water. Sulfonated polyether ketones are proton- and cation-conducting materials which are useful for electrodialysis or as a component of electrochemical cells.

The starting material is the aromatic polyether ketone indicated in formula (I).

The polymer is available commercially under the name Ultrapek.

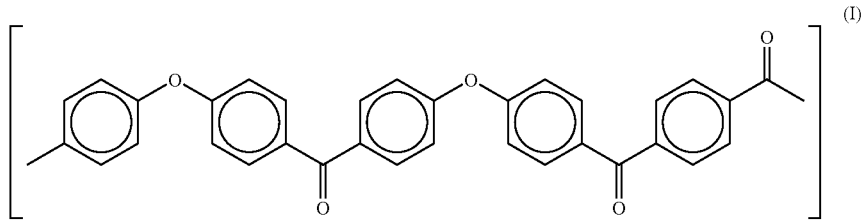

(I)

Polyether ketones are readily accessible. They can be built up in principle by electrophilic Friedel-Crafts polycondensation, in which a corresponding aromatic bis-acid dihalide is reacted with an aromatic ether. This possibility is set out, for example, in U.S. Pat. No. 3,065,205, GB-971 227, U.S. Pat. No. 3,441,538, GB-1 387 303 and WO 84-03 891 and in the paper by Iwakura, Y., Uno, K. and Tahiguchi, T. J., Polym. Sci., Pat. A-1, 6, 3345 (1968). In addition, the ether ketones can be obtained by nucleophilic aromatic substitution. For this purpose an appropriate aromatic bisdiol is reacted with an aromatic bishalo ketone, as described for example in: R. A. Clendinning, A. G. Farnham, W. F. Hall, R. N. Johnson and C. N. Merriam, J. Polym. Sci. A1, 5, 2375, (1967), GB-1 177 183, GB-1 141 421, EP-0 001 879, U.S. Pat. No. 4,108,837, U.S. Pat. No. 4,175,175, T. E. Attwood, A. B. Newton, J. B. Rose, Br. Polym. Journ., 4, 391, (1972); T. E. Attwood, P. C. Dawson, J. L. Freemann, L. R. J. Hoy, J. B. Rose, P. A. Staniland, Polymer, 22, 1096, (1981).

The preparation of sulfonated polyether ketones from some of these polyether ketones is described in EP-A-008 895, EP-A-041 780 and EP-A-575 807.

According to EP-A-008 895, the polymer to be sulfonated is suspended at room temperature in 98% strength by weight sulfuric acid. The dissolution process and the sulfonation proceed simultaneously to give, gradually, a highly viscous solution. This solution is either left as it is or diluted at the same temperature with sulfuric acid of the same concentration. The reaction takes place very slowly. Not until 10 weeks had elapsed were about 90% of the sulfonatable phenylene units in fact sulfonated. In the ether ketones employed, the numerical ratio of ether bridges to CO bridges was approximately 2:1.

According to the authors, under these conditions only O-phenylene-O units are sulfonated.

According to the process of EP-A-041 780, aromatic polyether ketones which are copolymers are sulfonated at elevated temperatures. Only some of the monomer units (A) are accessible to sulfonation, while monomer units (B) are not sulfonated. Thus the degree of sulfonation can be controlled by the ratio A/B. However, here too the reaction conditions remain unchanged during the dissolution process and thereafter. Under the conditions indicated, corresponding homopolymers (A) would be too highly sulfonated and would therefore lead to water-soluble compounds. Since in this case sulfonation takes place while the polymer is still in the process of dissolving, it is difficult to control the degree of sulfonation and to obtain products with a low degree of sulfonation. According to the authors, under these conditions only O-phenylene-O units are sulfonated.

In the case of the process disclosed in EP-A-575 807, the polymer to be sulfonated is suspended at room temperature in from 94 to 97% strength by weight sulfuric acid. The dissolution process and a partial sulfonation of the polymer proceeds simultaneously to give, gradually, a viscous solution. A sulfonating agent is added to the solution until the concentration of sulfuric acid is from 98 to 99.9% by weight. The solution is left until the desired degree of sulfonation has been reached, and is then worked up. Under these conditions only O-phenylene-O units are sulfonated, while O-phenylene-CO units are not attacked. This is also confirmed by Daoust et al. (Polymer, vol. 35 (25), 5491-5497 (1994)), where the sulfonation process is restricted to one sulfonic acid group per repeating unit and to one of the four equivalent positions of the phenylene ring surrounded by two ether units. According to Daoust, the other two phenylene rings are so highly deactivated by the adjacent ketone unit that no sulfonation takes place here.

In the sulfonation of polyether ketones using chlorosulfonic acid or an $SO_3$/triethyl phosphate complex, a high degree of crosslinking and decomposition of the polymer main chain are observed (Marvel et al., Journal of Polymer Science, Polymer Chem. Edition, vol. 23, 2205-2223, (1985) and Bishop et al., Macromolecules, vol. 18, 86-93 (1985)).

In the case of the processes known from the prior art, it is always only the O-phenylene-O units of the polyether ketones employed which are sulfonated, whereas O-phenylene-CO units and CO-phenylene-CO units remain unsulfonated or are sulfonated only to a minuscule extent, or, if more drastic conditions are employed, destruction of the polymer main chain occurs.

Polymers which do not have O-phenylene-O units, for example those of the formula (I), cannot be sulfonated, or not to any significant extent. The products obtained when relatively stringent reaction conditions are employed are insoluble in the customary solvents and can therefore not be processed further via a solution, or only with very great difficulty.

According to the process known from the prior art, therefore, it was not to be expected that polymers which possessed no O-phenylene-O units but only O-phenylene-CO units and CO-phenylene-CO units can be sulfonated. Likewise, from the prior art it was not to be expected that the sulfonated products obtained would dissolve in customary solvents.

The object of the present invention, therefore, is to provide a gentle and controllable process for the sulfonation of polyether ketones which can be used to sulfonate O-phenylene-CO units as well, and in this way to obtain novel sulfonated polyether ketones. A further object is to prepare solutions of these polymers.

Surprisingly it has now been found that, in contrast to the doctrine prevailing in the literature, it is possible to sulfonate polymers well and controllably, even at O-phenylene-CO units, with the products obtained even being soluble above a certain degree of sulfonation.

The present invention therefore provides a sulfonated aromatic polyether ketone of the formula (II)

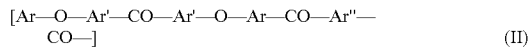

(II)

in which from 1% to 100% of the O-phenylene-CO units are substituted with an $SO_3M$ group and sulfonated and unsulfonated O-phenylene-CO units can be in any desired sequence with respect to one another.

The radicals Ar, Ar' and Ar" independently of one another are substituted or unsubstituted 1,2-, 1,3- or 1,4-phenylene rings.

M, taking into account the ionic valencies, comprises one or more elements selected from the following group: H, $NR_4^+$, where R is H or $C_1$-$C_4$-alkyl, or an alkali metal or alkaline earth metal or a metal from subgroup 8, and is preferably H, $NR_4^+$, Li, Na, K, Ca, Mg, Fe or Pt.

The present invention likewise provides a process for the preparation of these sulfonated polyether ketones, polymer electrolyte solutions comprising polymers of the formula (II), and the use of such polymer electrolyte solutions.

With the aid of the process according to the invention it is possible to sulfonate aromatic polyether ketones, including in particular those which possess no O-phenylene-O units, even at the O-phenylene-CO units.

The process comprises dissolving an appropriate unsulfonated aromatic polyether ketone of the formula (II) in from 94 to 98% strength by weight sulfuric acid, in particular from 94 to 97% by weight, adding a sulfonating agent to the solution obtained until the concentration of sulfuric acid is from 98 to 100% by weight or until the concentration of oleum is from 0.01 to 15% by weight of $SO_3$, and working up the reaction mixture as soon as the desired degree of sulfonation has been reached.

The aromatic polyether ketone is preferably dissolved in sulfuric acid under mild conditions, i.e. under conditions in which sulfonation is largely suppressed or in which sulfonation does not yet occur. The concentration of the sulfuric acid used for the dissolution is preferably from 94 to 97% by weight. The temperature of dissolution is chosen to be as low as possible, in order largely to avoid a commencement of the sulfonation reaction at this stage. In general, the dissolution temperature is between 10 and 80° C., in particular between 20 and 70° C. and, preferably, between 30 and 60° C.

In our investigations we observed, for the polyether ketone of formula (I) after the dissolution operation at not more than 80° C. and after 24 h at room temperature in 95 to 97% strength by weight sulfuric acid, a degree of sulfonation of less than 12 mol %, based on one repeating unit. The sulfonation temperature here is preferably in the range from 50 to 100° C.

Preferred dissolution conditions are those which lead to a degree of sulfonation of not more than 35%, based on one repeating unit. During the dissolution operation, sulfonation of the main chain is largely suppressed. Our own investigations showed that no degradation occurred during the dissolution operation.

As the sulfonating agent, which is used to increase the concentration of sulfuric acid and for sulfonation, it is preferred to employ fuming sulfuric acid, oleum, chlorosulfonic acid and sulfur trioxide.

After the dissolution operation, the concentration of sulfuric acid is increased, for example by adding oleum, until it is from 98 to 100% by weight, or until the concentration of oleum is from 0.01 to 15% by weight of $SO_3$, in particular until the concentration of sulfuric acid is from 99 to 100% by weight or until the concentration of oleum is from 0.01 to 5% by weight of $SO_3$, preferably until the concentration of oleum is from 0.01 to 1% by weight of $SO_3$.

During the actual sulfonation the reaction temperature can be higher or, alternatively, lower than in the dissolution process. Sulfonation is generally carried out at temperatures in the range from 10 to 100° C., in particular from 30 to 90° C., preferably in the range from 50 to 70° C. Both an increase in the temperature and an extension to the reaction time bring about an increase in the degree of sulfonation of the polymer. Typical reaction times are in the range from 45 minutes to 24 hours, in particular from 1 to 8 hours, preferably in the range from 1 to 4 hours. Investigations have shown that degradation of the polymer main chain during the sulfonation reaction occurs only to a very limited extent.

As soon as the desired degree of sulfonation has been reached, the reaction is terminated and the polymer is precipitated, for example in an aqueous medium, isolated and dried. The process described gives sulfonation products which above a certain degree of sulfonation can be dissolved in conventional solvents, for example NMP or DMSO.

After sulfonation, the sulfonic acid groups ($SO_3H$) can be converted into their salt form ($SO_3M$) by the known methods.

The advantage of the sulfonated O-phenylene-CO units in comparison to sulfonated O-phenylene-O units in conventional polymers is, inter alia, the better stability of the $SO_3M$ groups to hydrolysis. In an aqueous environment and at elevated temperatures, desulfonation of the sulfonated polyether ketones may occur. It is known that the extent of hydrolytic desulfonation depends on the electron richness of the aromatic rings. The general rule is that, the easier an aromatic unit can be sulfonated, the easier too it can be desulfonated.

When sulfonated polymers are employed in an aqueous medium, it is vital that the properties of the sulfonated polymer remain constant. In such applications it is therefore advantageous to use a sulfonated polyether ketone which permits little or no desulfonation. A polymer whose sulfonic acid groups are located to a maximum degree at O-phenylene-CO units, consequently, is particularly suitable in such cases.

The process described gives sulfonation products which above a certain degree of sulfonation can be dissolved in conventional solvents, for example N-methylpyrrolidone (NMP) or dimethyl sulfoxide (DMSO). The polymer electrolyte solutions prepared in this way, in a preferred embodiment, contain at least 1% by weight of polyether ketones of the formula (II) and, as principal constituent, aprotic dipolar solvents, for example NMP or DMSO.

Depending on the intended subsequent use of the polymer electrolyte solution, it may if desired comprise a further unsulfonated polymer or else small quantities of auxiliaries.

The polymer electrolyte solutions according to the invention are particularly suitable for preparing asymmetric membranes, for example for nano-, ultra- or microfiltration, and for preparing cohesive films having a thickness in the range from 5 μm to 1 mm.

The polymer electrolyte solutions according to the invention have an especially important role in the establishment of particularly intensive contact between two polymer electrolyte surfaces. A porous or rough surface can in this way be obtained, for example, after contacting the solution with a precipitating agent.

EXAMPLES

96% strength concentrated sulfuric acid was placed in a four-necked stirred apparatus fitted with dropping funnel and oil bath, and polyether ketone of the formula (I) was dissolved. A sulfonating mixture with oleum concentrations of from 0.1 to 0.7% by weight of $SO_3$ was then established by titration with oleum (containing 20% $SO_3$). The mixture was then brought to room temperature to ensure controlled sulfonation. After the desired degree of sulfonation had been reached, the reaction was terminated and the product was isolated. The product was characterized by viscometry, $^{13}$C-NMR spectroscopy and elemental analysis.

The experiments in Table 1 were carried out with a homopolymer of the formula (I). The following abbreviations are used in the table.

TABLE 1

| EN | PC | DT | Dt | RC | RT | Rt | DS | IV |
|----|-----|----|----|-----|----|-----|-------|------|
| 1  | 6.7 | 50 | 60 | 0.4 | 60 | 0   | 5.8   | 0.93 |
| 2  | 6.7 | 50 | 60 | 0.4 | 60 | 30  | 22.0  | 0.90 |
| 3  | 6.7 | 50 | 60 | 0.4 | 60 | 60  | 35.3  | 0.87 |
| 4  | 6.7 | 50 | 60 | 0.4 | 60 | 90  | 44.1  | 0.85 |
| 5  | 6.7 | 50 | 60 | 0.4 | 60 | 120 | 51.4  | 0.84 |
| 6  | 6.7 | 50 | 60 | 0.4 | 60 | 150 | 59.6  | 0.82 |
| 7  | 6.7 | 50 | 60 | 0.7 | 50 | 0   | 9.0   | 1.01 |
| 8  | 6.7 | 50 | 60 | 0.7 | 50 | 30  | 18.5  | 0.96 |
| 9  | 6.7 | 50 | 60 | 0.7 | 50 | 60  | 27.4  | 0.93 |
| 10 | 6.7 | 50 | 60 | 0.7 | 50 | 120 | 44.6  | 0.91 |
| 11 | 6.7 | 50 | 60 | 0.7 | 50 | 180 | 56.8  | 0.89 |
| 12 | 6.7 | 50 | 60 | 0.7 | 50 | 240 | 65.1  | 0.84 |
| 13 | 6.7 | 50 | 60 | 0.7 | 50 | 360 | 81.0  | 0.81 |
| 14 | 6.7 | 50 | 60 | 0.7 | 50 | 460 | 96.0  | 0.76 |
| 15 | 6.7 | 50 | 60 | 0.7 | 50 | 525 | 104.0 | 0.74 |
| 16 | 6.7 | 50 | 60 | 0.7 | 70 | 0   | 6.6   | 0.94 |
| 17 | 6.7 | 50 | 60 | 0.7 | 70 | 60  | 99.9  | 0.79 |
| 18 | 6.7 | 50 | 60 | 0.7 | 70 | 120 | 152.2 | 0.71 |
| 19 | 6.7 | 50 | 60 | 0.7 | 70 | 180 | 188.2 | 0.62 |
| 20 | 6.7 | 50 | 60 | 0.7 | 70 | 240 | 213.8 | 0.58 |
| 21 | 6.7 | 50 | 60 | 0.7 | 70 | 320 | 229.8 | 0.55 |
| 22 | 6.7 | 50 | 60 | 0.1 | 50 | 0   | 3.0   | 1.02 |
| 23 | 6.7 | 50 | 60 | 0.1 | 50 | 60  | 5.3   | 0.97 |

TABLE 1-continued

| EN | PC | DT | Dt | RC | RT | Rt | DS | IV |
|----|-----|----|----|-----|----|-----|------|------|
| 24 | 6.7 | 50 | 60 | 0.1 | 50 | 120 | 9.7  | 0.94 |
| 25 | 6.7 | 50 | 60 | 0.1 | 50 | 180 | 14.1 | 0.91 |
| 26 | 6.7 | 50 | 60 | 0.1 | 50 | 240 | 17.8 | 0.89 |
| 27 | 6.7 | 50 | 60 | 0.1 | 50 | 300 | 22.3 | 0.88 |
| 28 | 6.7 | 50 | 60 | 0.1 | 50 | 435 | 28.2 | 0.84 |
| 29 | 6.7 | 50 | 60 | 0.1 | 70 | 0   | 6.3  | 0.91 |
| 30 | 6.7 | 50 | 60 | 0.1 | 70 | 30  | 37.3 | 0.87 |
| 31 | 6.7 | 50 | 60 | 0.1 | 70 | 60  | 43.8 | 0.85 |
| 32 | 6.7 | 50 | 60 | 0.1 | 70 | 120 | 52.9 | 0.82 |
| 33 | 6.7 | 50 | 60 | 0.1 | 70 | 180 | 59.0 | 0.79 |
| 34 | 6.7 | 50 | 60 | 0.1 | 70 | 330 | 81.8 | 0.74 |
| 35 | 6.7 | 50 | 60 | 0.1 | 70 | 390 | 86.3 | 0.70 |

EN Experiment number
PC Polymer concentration in % by weight
DT Dissolution temperature in ° C.
Dt Dissolution time in min.
RC Reaction concentration of oleum in % by weight of $SO_3$
RT Reaction temperature in ° C. (sulfonation temperature)
Rt Reaction time in min.
DS Degree of sulfonation in mol % based on one repeating unit
IV Intrinsic viscosity in dl/g measured in conc. $H_2SO_4$ at 25° C.

The invention claimed is:

1. A process for the preparation of a polyether ketone of the formula (II)

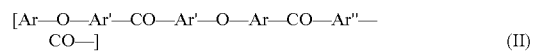
$$[Ar—O—Ar'—CO—Ar'—O—Ar—CO—Ar''—CO—] \quad (II)$$

in which from 1% to 100% of the O-phenylene-CO units are substituted with an $SO_3M$ group and sulfonated and unsulfonated O-phenylene-CO units can be in any desired sequence with respect to one another, the radicals Ar, Ar' and Ar'' independently of one another are substituted or unsubstituted 1,2-, 1,3- or 1,4-phenylene rings, and M taking into account the ionic valencies, comprises one or more elements selected from the group consisting of H, NR where R is H or $C_1$-$C_4$-alkyl, or an alkali metal or alkaline earth metal or a metal from subgroup 8, by dissolving the corresponding unsulfonated polyetherketone of the formula (II) in from 94 to 97% strength by weight sulfuric acid, adding a sulfonating agent to the solution thus obtained, at an appropriate temperature, until the concentration of sulfuric acid is from 98 to 100% by weight or the concentration of oleum is from 0.01 to 15% by weight $SO_3$, and working up the reaction mixture as soon as the desired degree of sulfonation has been reached and optionally converting the sulfonic acid groups into their salt form.

2. The process as claimed in claim 1, wherein the dissolution temperature is in the range from 10 to 80° C.

3. The process as claimed in claim 1, wherein the sulfonation temperature is in the range from 10 to 100° C.

4. The process as claimed in claim 1, wherein following addition of the sulfonating agent the temperature of the solution is at least 30° C.

5. The process as claimed in claim 1, wherein the sulfonating agent used is sulfuric acid, fuming sulfuric acid, oleum, chlorosulfonic acid, sulfur trioxide or a mixture of these compounds.

6. The process as claimed in claim 1, wherein oleum is added to the polyether ketone, dissolved in sulfuric acid, until the concentration of sulfuric acid is from 98 to 100% by weight or the concentration of oleum is from 0.01 to 15% by weight of $SO_3$.

7. The process as claimed in claim 1, wherein polyether ketone is of the formula (I)

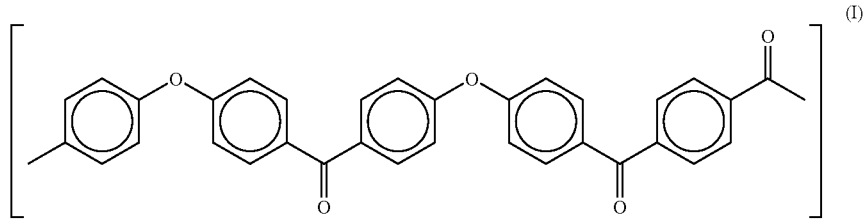

is dissolved in from 95 to 97% strength by weight sulfuric acid at not more than 80° C. and is sulfonated at temperatures of from 50 to 100° C.

8. The process as claimed in claim 1, wherein the corresponding unsulfonated polyether ketone of the formula (II) is dissolved in from 95 to 97% strength by weight sulfuric acid at not more than 80° C. and is sulfonated at temperatures of from 50 to 100° C.

9. The process as claimed in claim 1, wherein R is selected from the group consisting of H, $NR_4^+$, Li, Na, K, Ca, Mg, Fe and Pt.

* * * * *